(12) United States Patent
Emoto et al.

(10) Patent No.: US 6,517,336 B1
(45) Date of Patent: Feb. 11, 2003

(54) INJECTION MOLDING MACHINE HAVING COAXIAL INJECTION MOTOR AND TRANSMISSION SHAFT

(75) Inventors: Atsushi Emoto, Chiba (JP); Noritsugu Hiraga, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/463,960

(22) PCT Filed: Apr. 28, 1999

(86) PCT No.: PCT/JP99/02285

§ 371 (c)(1),
(2), (4) Date: Feb. 10, 2000

(87) PCT Pub. No.: WO99/65660

PCT Pub. Date: Dec. 23, 1999

(30) Foreign Application Priority Data

| Jun. 16, 1998 | (JP) | 10-167977 |
| Aug. 5, 1998 | (JP) | 10-221521 |
| Sep. 1, 1998 | (JP) | 10-247277 |

(51) Int. Cl.[7] ............................................. B29C 45/77
(52) U.S. Cl. ...................... 425/145; 264/40.7; 425/149; 425/167; 425/542
(58) Field of Search ........................... 425/142, 145, 425/149, 167, 542; 264/40.7

(56) References Cited

U.S. PATENT DOCUMENTS 4,755,123 A * 7/1988 Otake ........................ 425/145
5,679,384 A * 10/1997 Emoto ........................ 425/145
5,891,485 A * 4/1999 Emoto ........................ 425/145

FOREIGN PATENT DOCUMENTS

| JP | 61-266218 | 11/1986 |
| JP | 3-278930 | 12/1991 |
| JP | 8-197595 | 8/1996 |
| JP | 409174626 A | * 7/1997 |
| JP | 409267369 A | * 10/1997 |

* cited by examiner

Primary Examiner—Jan H. Silbaugh
Assistant Examiner—Emmanuel Luk
(74) Attorney, Agent, or Firm—Squire Sanders & Dempsey LLP

(57) ABSTRACT

The injection molding machine comprises a cylinder member; an injection member disposed within the cylinder member such that the injection member can advance and retract; an injection motor (82); and a transmission shaft which is connected to the injection member such that the transmission shaft can rotate relative to the injection member. The transmission shaft has a rotation transmission portion, to which rotation of the injection motor (82) is transmitted, as well as a motion conversion portion for converting rotational motion to linear motion. The injection motor (82) and the transmission shaft are disposed on the same axis, and the transmission shaft is advanced and retracted inside the rotor (92) of the injection motor (82). Since the transmission shaft is advanced and retracted inside the rotor (92) of the injection motor (82), the injection molding machine can be reduced in axial length.

12 Claims, 10 Drawing Sheets

INJECTION MOLDING MACHINE HAVING COAXIAL INJECTION MOTOR AND TRANSMISSION SHAFT

TECHNICAL FIELD

The present invention relates to an injection molding machine.

BACKGROUND ART

Conventionally, in an injection molding machine, resin heated and melted in a heating cylinder is injected into the cavity of a mold apparatus under high pressure so that the cavity is filled with the resin. The molten resin is then cooled and solidified so as to obtain a molded article.

For performing such molding operation, the injection molding machine includes a mold clamping apparatus and an injection apparatus. The mold clamping apparatus is provided with a stationary platen and a movable platen. The movable platen is advanced and retracted by a mold clamping cylinder, to thereby perform mold closing, mold clamping, and mold opening.

The injection apparatus includes a heating cylinder for heating and melting resin supplied from a hopper, and an injection nozzle for injecting the molten resin. Further, a screw is disposed within the heating cylinder such that the screw can be rotated and can be advanced and retracted. The screw is advanced so as to inject the resin from the injection nozzle, and is retracted so as to meter the resin.

In order to advance and retract the screw, a motor-driven injection apparatus is provided.

FIG. 1 is a schematic view of a conventional injection apparatus.

In FIG. 1, reference numeral 2 denotes an injection apparatus, and 4 denotes a frame of the injection apparatus 2. A heating cylinder 21 is fixedly provided in front (left side in FIG. 1) of the frame 4, and an injection nozzle 21a is provided at the front end (left-side end in FIG. 1) of the heating cylinder 21. A hopper 21b is disposed on the heating cylinder 21, and a screw 20 is disposed within the heating cylinder 21 such that the screw 20 can be rotated and can be advanced and retracted (moved leftward and rightward in FIG. 1, respectively). The rear end (right-side end in FIG. 1) of the screw 20 is rotatably supported by a support member 5.

Attached to the support member 5 is a metering motor 6 having a speed reduction mechanism. The rotation of the metering motor 6 is transmitted to the screw 20 via a timing belt 7a.

Further, a screw shaft 8 is rotatably supported in parallel with the screw 20. The rear end of the screw shaft 8 is connected, via a timing belt 7b, to an injection motor 9 having a speed reduction mechanism. That is, the injection motor 9 is adapted to rotate the screw shaft 8. The front end of the screw shaft 8 is in screw engagement with a nut 5a fixed to the support member 5. Accordingly, when the injection motor 9 is driven, the nut 5a can be moved axially through rotation of the screw shaft 8 via the timing belt 7b.

In the injection apparatus 2 having the above-described structure, during a metering stage, the metering motor 6 is driven in order to rotate the screw 20 via the timing belt 7a, thereby retracting the screw 20 by a predetermined distance (rightward in FIG. 1). At this time, resin is supplied from the hopper 21b, heated and melted within the heating cylinder 21, and accumulated forward of the screw 20 as the screw 20 retracts.

Further, during an injection stage, the injection motor 9 is driven in order to rotate the screw shaft 8 via the timing belt 7b, so that the nut 5a and the support member 5 are moved with the rotation of the screw shaft 8. As a result, the screw 20 is advanced (moved leftward in FIG. 1), and the resin accumulated forward of the screw 20 is injected from the injection nozzle 21a.

However, the injection apparatus 2 has the following drawbacks. That is, in the injection apparatus 2, the metering motor 6 and the injection motor 9 must be driven during the metering stage and the injection stage, respectively. Further, rotation of the metering motor 6 and rotation of the injection motor 9 are transmitted to the screw 20 via speed reduction mechanisms, pulleys, etc. Therefore, mechanical efficiency is comparatively low, and inertia is comparatively high. As a result, during the injection stage, reaching an initial injection speed and changing the injection speed require a comparatively long period of time and a comparatively large torque. Further, the time required to proceed from the injection stage to the pressure holding stage is comparatively long.

In order to overcome the above-described drawbacks, there has been provided a built-in-motor-type injection apparatus in which a screw, an injection motor, and a metering motor are disposed on a common axis.

FIG. 2 is a sectional view of such a conventional built-in-motor-type injection apparatus.

In FIG. 2, reference numeral 12 denotes a heating cylinder, and an injection nozzle 12a is provided at the front end (left-side end in FIG. 2) of the heating cylinder 12. A screw 22 is disposed within the heating cylinder 12 such that the screw 22 can be rotated and can be advanced and retracted (moved leftward and rightward in FIG. 2).

The screw 22 has a screw head 22a at its front end. The screw 22 extends rearward (rightward in FIG. 2) within the heating cylinder 12, and is connected at its rear end (right-side end in FIG. 2) to a first spline shaft 63.

Therefore, during a metering stage, when the screw 22 is retracted (moved rightward in FIG. 2) by a determined distance, while being rotated, resin in the form of pellets is supplied from an unillustrated hopper, heated and melted within the heating cylinder 12, and accumulated forward (leftward in FIG. 2) of the screw head 22a as the screw 22 retracts.

Further, during an injection stage, when the screw 22 is advanced (moved leftward in FIG. 2), the resin accumulated forward of the screw head 22a is injected from the injection nozzle 21a and charged into a cavity of an unillustrated mold apparatus.

A drive section casing 11 is fixed to the rear end of the heating cylinder 12. A metering motor 44 is disposed at the front portion (left-side portion) of the drive section casing 11 and an injection motor 45 is disposed at the rear portion (right-side portion) of the drive section casing 11 such that the metering motor 44 and the injection motor 45 share a common center axis. The metering motor 44 comprises a stator 46 and a rotor 47, and the injection motor 45 comprises a stator 48 and a rotor 49.

The rotor 47 is supported to be rotatable relative to the drive section casing 11. Specifically, a hollow first rotor shaft 56 is fixedly fitted into the rotor 47, and the first rotor shaft 56 is supported by bearings 51 and 52.

Similarly, the rotor 49 is supported to be rotatable relative to the drive section casing 11. Specifically, a hollow second rotor shaft 57 is fixedly fitted into the rotor 49, and the second rotor shaft 57 is supported by bearings 53 and 54.

The screw 22 can be retracted, while being rotated, through drive of the metering motor 44. In order to enable this movement, a first spline nut 62 is fixed to the front end of the first rotor shaft 56; a first spline shaft 63 is in spline-engagement with the first spline nut 62; and the screw 22 is fixed to the front end of the first spline shaft 63. Therefore, when the rotor 47 is rotated through drive of the metering motor 44, rotation of the rotor 47 is transmitted to the screw 22, so that the screw 22 rotates. At this time, the first spline shaft 63 is retracted relative to the first spline nut 62, so that the screw 22 is retracted. It is to be noted that when the screw 22 is retracted, back pressure is applied to the screw 22 against pressure generated by the resin.

Further, the screw 22 can be advanced through drive of the injection motor 45. In order to enable this movement, an annular bearing retainer 64 is fixed to the rear end of the second rotor shaft 57; and a ball screw shaft 65 is inserted into and fixed to the bearing retainer 64. The ball screw shaft 65 is supported to be rotatable relative to the drive section casing 11. Specifically, the ball screw shaft 65 is supported on the drive section casing 11 via the bearing retainer 64 and a bearing 66, as well as via a bearing 67 disposed on the rear side of the bearing 66.

A ball nut 69 is disposed within the second rotor shaft 57 such that the ball nut 69 can advance and retracts, and is in meshing-engagement with the ball screw shaft 65. Accordingly, rotation of the rotor 49 is transmitted to the ball screw shaft 65 via the second rotor shaft 57 and the bearing retainer 64. The ball nut 69 and the ball screw shaft 65 convert rotational motion to linear motion, so that the ball nut 69 is advanced and retracted.

Further, in order to prevent the ball nut 69 from rotating together with the ball screw shaft 65, a hollow second spline shaft 71 is fixed to the front end of the ball nut 69, and the second spline shaft 71 is in spline-engagement with a second spline nut 76 fixed to the drive section casing 11.

A bearing box 72 is fixed to the front end of the second spline shaft 71. A thrust bearing 73 is disposed within the bearing box 72 to be located at the front side thereof, and a bearing 74 is disposed within the bearing box 72 to be located at the rear side thereof. Accordingly, the first spline shaft 63 is supported by the bearings 73 and 74 to be rotatable relative to the second spline shaft 71 and the ball nut 69.

In the above-described structure, rotation of the metering motor 44 and rotation of the injection motor 45 are transmitted to the screw 22 without intervention of a speed reduction mechanism, pulleys, etc. Therefore, mechanical efficiency increases, and inertia decreases.

The drive section casing 11 is formed of a front cover 11a, a center casing 11b, and a rear cover 11c; and the heating cylinder 12 is fixed to the front end of the front cover 11a.

The metering motor 44 is surrounded by a sleeve-shaped stator frame 46a, and the injection motor 45 is surrounded by a sleeve-shaped stator frame 48a. The front cover 11a and the center casing 11b are connected together by use of threaded rods 46b, with the stator frame 46a being sandwiched between the front cover 11a and the center casing 11b. Similarly, the center casing 11b and the rear cover 11c are connected together by use of threaded rods 48b, with the stator frame 48a being sandwiched between the center casing 11b and the rear cover 11c. The stator frame 48a is supported by means of frictional force generated through tightening of the rods 48b.

In the above-described conventional injection apparatus, since the metering motor 44 and the injection motor 45 are disposed on the same axis, the injection molding machine is increased in axial length. When an attempt is made to reduce the injection molding machine in axial length, the outer diameters of the metering motor 44 and the injection motor 45 increase, resulting in increased inertia.

Further, when the injection motor 45 is driven in order to rotate the ball screw shaft 65 to thereby inject the resin from the heating cylinder 12 through advancement of the screw 22, a reaction force corresponding to the injection force is transmitted to the rods 46b via the heating cylinder 12 and the front cover 11a, and to the rods 48b via the rear cover 11c. Therefore, the rods 46b and 48b extend, resulting in weakened tightening force.

In the above-described structure, when the rotor 47 or 49 is rotated upon drive of the metering motor 44 or the injection motor 45, the stator frame 46a or 48a may rotate. Therefore, the tightening force of the rods 46a and 48b must be controlled strictly. This makes assembly and maintenance of the injection molding machine more troublesome.

An object of the present invention is to solve the above-mentioned problems in the conventional injection apparatus, and to provide an injection molding machine which has improved mechanical efficiency and reduced inertia, which has a shortened axial length, and which facilitates assembly and maintenance.

DISCLOSURE OF THE INVENTION

To achieve the above objects, an injection molding machine according to the present invention comprises a cylinder member; an injection member disposed within the cylinder member such that the injection member can advance and retract; an injection motor; and a transmission shaft which is connected to the injection member such that the transmission shaft can rotate relative to the injection member. The transmission shaft has a rotation transmission portion, to which rotation of the injection motor is transmitted, as well as a motion conversion portion for converting rotational motion to linear motion.

The injection motor and the transmission shaft are disposed on the same axis, and the transmission shaft is advanced and retracted inside the rotor of the injection motor.

In this case, since rotation of the injection motor is transmitted directly to the transmission shaft without intervention of a speed reduction mechanism, a pulley, and the like, mechanical efficiency can be improved, and inertia can be decreased. As a result, during the injection stage, it becomes possible to shorten the time required for establishing or changing the injection speed and to reduce the torque required for establishing or changing the injection speed. Further, the time required for changeover from the injection stage to the pressure holding stage is shortened.

Since the transmission shaft is advanced and retracted inside the rotor, the injection molding machine can be reduced in axial length.

In another injection molding machine according to the present invention, the injection motor and the transmission shaft are disposed on the same axis as that of the injection member.

In still another injection molding machine according to the present invention, the injection motor, the transmission shaft, and the injection member are disposed on different axes separated from one another.

In still another injection molding machine according to the present invention, there is provided a metering motor which is disposed on the same axis as that of the injection member.

In still another injection molding machine according to the present invention, there is provided a metering motor which is disposed on an axis different from that of the injection member and is connected to the injection member via transmission means.

In still another injection molding machine according to the present invention, the transmission shaft comprises a ball screw shaft portion and a spline shaft portion.

The present invention provides yet another injection molding machine which comprises a heating cylinder; a screw disposed within the heating cylinder such that the screw can advance and retract; an injection motor; and a transmission shaft which is connected to the screw such that the transmission shaft can rotate relative to the screw. The transmission shaft has a rotation transmission portion, to which rotation of the injection motor is transmitted, as well as a motion conversion portion for converting rotational motion to linear motion.

The injection motor and the transmission shaft are disposed on the same axis, and the transmission shaft is advanced and retracted inside the rotor of the injection motor.

The present invention provides still another injection molding machine which comprises a hollow motor having a stator and a rotor; a stator frame disposed to surround the hollow motor and supporting the stator; and first and second plates removably connected to opposite ends of the stator frame.

In this case, the hollow motor can be exchanged through separation of the first and second plates from the stator frame.

Since the stator frame and the first and second plates are connected together, the stator frame does not rotate when the hollow motor is driven. Accordingly, strict control of the tightening force with which the stator frame and the first and second plates are connected together is not required.

As a result, assembly and maintenance of the injection molding machine are facilitated.

In still another injection molding machine according to the present invention, a tensile force generated upon drive of the hollow motor is transmitted to the stator frame.

In still another injection molding machine according to the present invention, the stator frame has a cylindrical portion for supporting the stator and flange portions formed at opposite ends of the cylindrical portion.

The present invention provides yet another injection molding machine which comprises a rotatably supported hollow rotor shaft; a motor; and an injection member disposed on the same axis as that of the motor. The motor comprises a stator, and a rotor disposed on the radially inner side of the stator and fixed to the rotor shaft.

When the injection member is located at the retraction end of a stroke, the rear end of the injection member is moved to a position located rearward from the front end of the rotor shaft.

In this case, during advancement and retraction of the injection member, the injection member can overlap with the motor. Therefore, the injection molding machine can be reduced in axial length.

In still another injection molding machine according to the present invention, a sleeve is fixed to the front end of the rotor shaft; a spline nut is fixed to the rear end of the sleeve; and a spline shaft in spline-engagement with the spline nut is connected to the injection member.

In this case, when the injection member is located at the retraction end of a stroke, the rear end of the injection member is moved to a position located rearward from the front end of the rotor shaft by a distance corresponding to the length of the sleeve.

BEST MODE FOR CARRYING OUT THE INVENTION

The embodiments of the present invention will next be described in detail with reference to the drawings.

Figure 3:
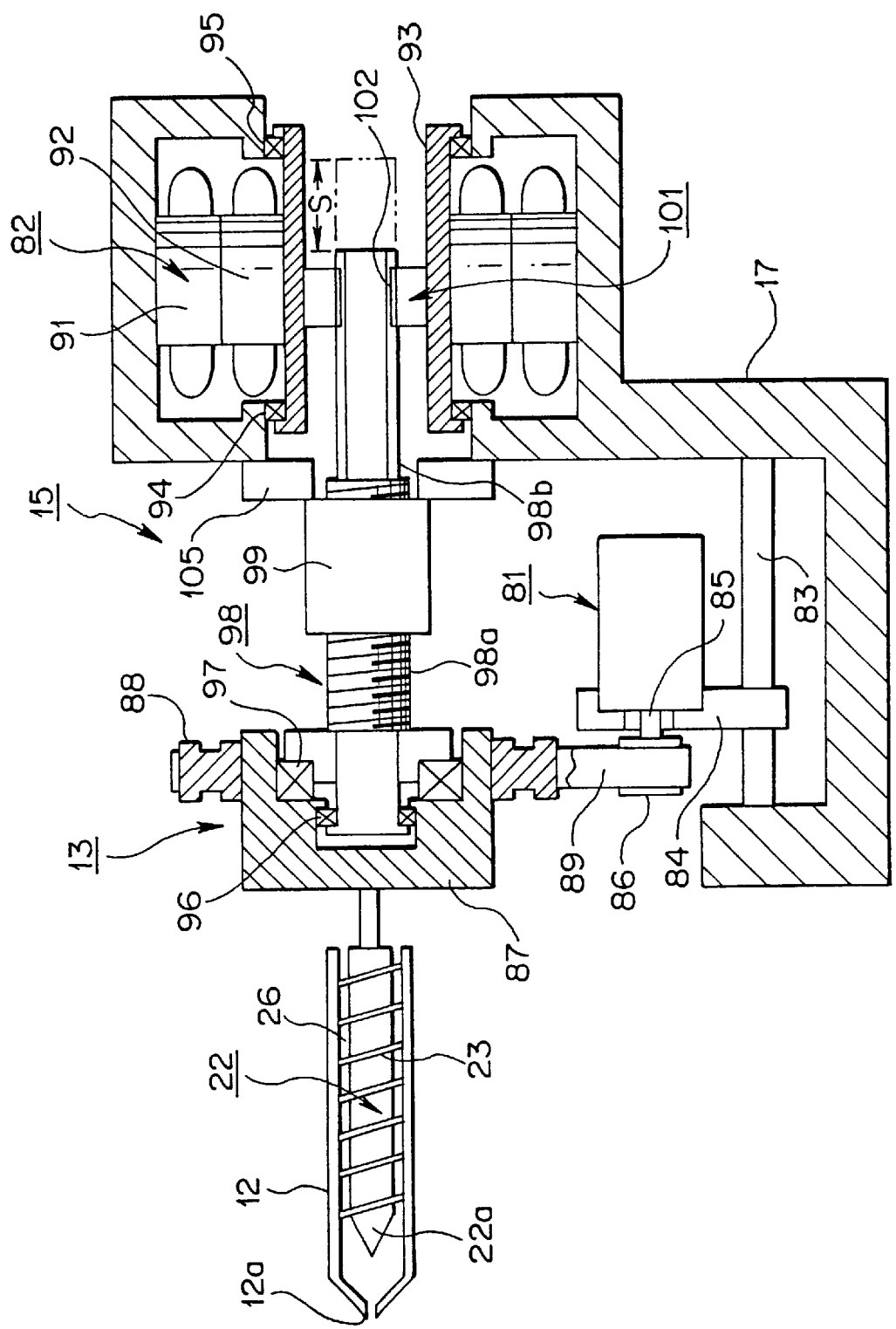
FIG. 3 is a sectional view of a built-in-motor-type injection apparatus according to a first embodiment of the present invention.
Figure 4:
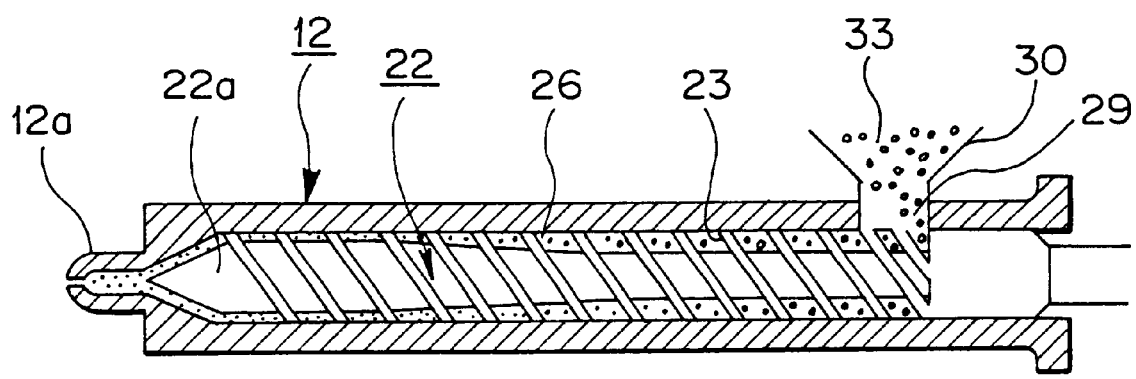
FIG. 4 is a sectional view of a main portion of the built-in-motor-type injection apparatus according to the first embodiment of the present invention.
Figure 5:
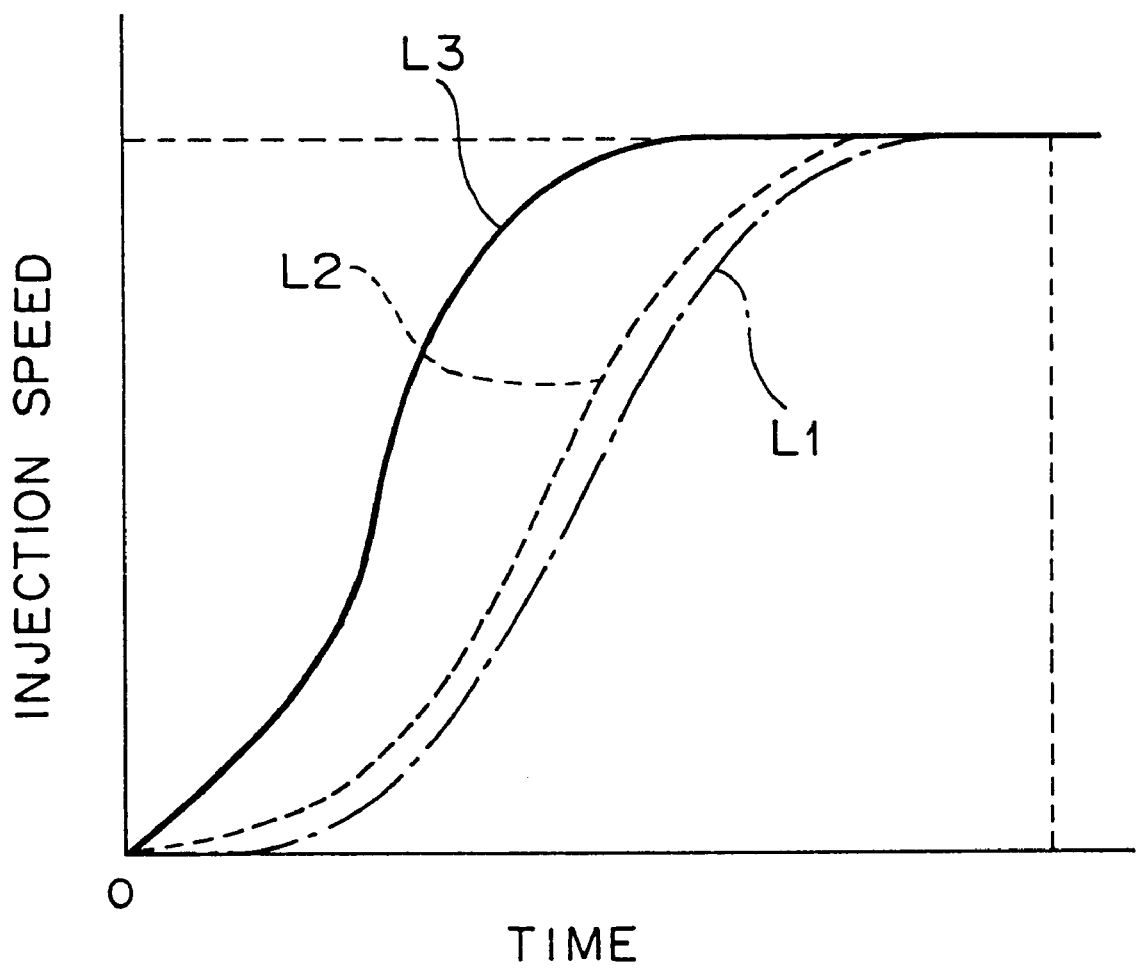
FIG. 5 is a graph for comparison of injection characteristics.

FIG. 3 is a sectional view of a built-in-motor-type injection apparatus according to a first embodiment of the present invention; FIG. 4 is a sectional view of a main portion of the built-in-motor-type injection apparatus according to the first embodiment of the present invention; and FIG. 5 is a graph for comparison of injection characteristics. In FIG. 5, the horizontal axis represents time, and the vertical axis represents injection speed.

In FIGS. 3 and 4, reference numeral 12 denotes a heating cylinder serving as the cylinder member. The heating cylinder 12 has an injection nozzle 12a at its front end (left-side end in FIG. 3). A screw 22 serving as the injection member is disposed within the heating cylinder 12 such that the screw 22 can rotate and can be advanced and retracted (moved leftward and rightward in FIG. 3).

The screw 22 has a screw head 22a at its front end, and extends rearward (rightward in FIG. 3) within the heating cylinder 12. The rear end (right-side end in FIG. 3) of the screw 22 is fixed to a bearing box 13. Also, a helical flight 23 is formed on the peripheral surface of the screw 22, resulting in formation of a groove 26.

A resin supply port 29 is formed at a predetermined position on the heating cylinder 12, and a hopper 30 is fixed to the resin supply port 29. The resin supply port 29 is formed at a position such that the resin supply port 29 faces the rear end portion (right-side end in FIG. 3) of the groove 26 when the screw 22 is positioned at a forwardmost position (leftward in FIG. 3) within the heating cylinder 12.

During a metering stage, the screw 22 is retracted (i.e. moved rightward in FIG. 3) by a predetermined distance while being rotated, so that pellet-shaped resin 33 is fed from the hopper 30 into the heating cylinder 12. The resin 33 is advanced (i.e. moved leftward in FIG. 3) along the groove 26.

Also, an unillustrated heater serving as heating means is disposed around the heating cylinder 12. The heater heats the heating cylinder 12 to thereby melt the resin 33 within the groove 26. Therefore, when the screw 22 is retracted by the predetermined distance while being rotated, molten resin for one shot is accumulated forward of the screw head 22a.

In a subsequent injection stage, when the screw 22 is advanced, the molten resin accumulated forward of the screw head 22a is injected from the injection nozzle 12a, and is charged into a cavity of an unillustrated mold apparatus.

At the rear of the heating cylinder 12 is disposed a drive section 15 for rotating, advancing, and retracting the screw 22. The drive section 15 includes a frame 17, a metering motor 81 serving as first drive means, and an injection motor 82 serving as second drive means. The metering motor 81 is movably disposed on the frame 17. The injection motor 82 is fixed to the frame 17. The injection motor 82 and the screw 22 are disposed on the same axis.

A guide bar 83 serving as a guide member is disposed on the frame 17 such that the guide bar 83 extends parallel with the screw 22. The metering motor 81 is moved along the guide bar 83. For this purpose, a support plate 84 is slidably supported by the guide bar 83, and the metering motor 81 is attached to the support plate 84.

Also, a drive-side pulley 86 is fixed to an output shaft 85 of the metering motor 81, and a driven-side pulley 88 is fixed to the outer circumference a boxy body 87 of the bearing box 13. A timing belt 89 extends between and is wound around the drive-side pulley 86 and the driven-side pulley 88. The drive-side pulley 86, the driven-side pulley 88, and the timing belt 89 constitute transmission means for connecting the bearing box 13 and the metering motor 81.

The injection motor 82 comprises a stator 91 fixed to the frame 17, and a rotor 92 disposed inside the stator 91. The rotor 92 is supported to be rotatable relative to the frame 17. Specifically, a hollow rotor shaft 93 is fixedly fitted into the rotor 92, and the opposite ends of the rotor shaft 93 are supported by the frame 17 via bearings 94 and 95.

Bearings 96 and 97 are disposed within the bearing box 13. The screw 22 is connected, via the bearings 96 and 97, to a ball screw shaft/spline shaft unit 98 serving as a transmission shaft, such that the screw 22 and the ball screw shaft/spline shaft unit 98 are rotatable relative to each other. A ball nut 99, which is fixed to the frame 17 via a load cell 105 serving as load detection means, is in screw-engagement with a ball screw shaft portion 98a which is formed at the front-half portion of the ball screw shaft/spline shaft unit 98 and serves as a motion conversion portion. The bearing box 13 constitutes drive force transmission means which allows relative rotation between the screw 22 and the ball screw shaft/spline shaft unit 98 while restricting relative axial movement between the screw 22 and the ball screw shaft/spline shaft unit 98. Further, the ball nut 99 and the ball screw shaft portion 98a constitute motion conversion means for converting rotational motion to linear motion.

Consequently, during a metering stage, when the metering motor 81 is driven, rotation of the metering motor 81 is sequentially transmitted to the drive-side pulley 86, the timing belt 89, the box body 87, and the screw 22, so that the screw 22 is rotated. In this case, the screw 22 and the ball screw shaft/spline shaft unit 98 are rotatably coupled to each other via the bearing box 13. Therefore, the rotation transmitted to the box body 87 is not transmitted to the ball screw shaft/spline shaft unit 98; however, the pressure of the resin within the heating cylinder 12 is transmitted to the ball screw shaft/spline shaft unit 98 via the bearing box 13. As a result, the ball screw shaft/spline shaft unit 98 is retracted while being rotated, so that the screw 22 is also retracted while being rotated. When the screw 22 is retracted, back pressure is applied to the screw 22 against the pressure of the resin.

The screw 22 can be advanced through application of a current of a predetermined frequency to the stator 91 of the injection motor 82. For this purpose, an annular engagement member 101 is fixed onto the inner circumference of the rotor shaft 93 and is located at a substantially central portion thereof, so that a spline 102 formed on the inner circumferential surface of the engagement member 101 is engaged with a spline shaft portion 98b, which is formed on the outer circumferential surface of the rear-half portion of the ball screw shaft/spline shaft unit 98 and serves as a rotation transmission portion. The spline 102 and the spline shaft portion 98b constitute rotation transmission means to which the rotation of the injection motor 82 is transmitted.

Consequently, during an injection stage, when the injection motor 82 is driven, rotation of the injection motor 82 is sequentially transmitted to the rotor shaft 93, the engagement member 101, and the ball screw shaft/spline shaft unit 98. Since the ball nut 99 is fixed to the frame 17, the ball screw shaft/spline shaft unit 98 is advanced while being rotated, so that the screw 22 is also advanced. At this time, the injection force acting on the ball screw shaft/spline shaft unit 98 is transmitted to the load cell 105 via the ball nut 99, and is detected by the load cell 105.

The ball screw shaft/spline shaft unit 98 is retracted in the axial direction by a stroke S.

Figure 1:
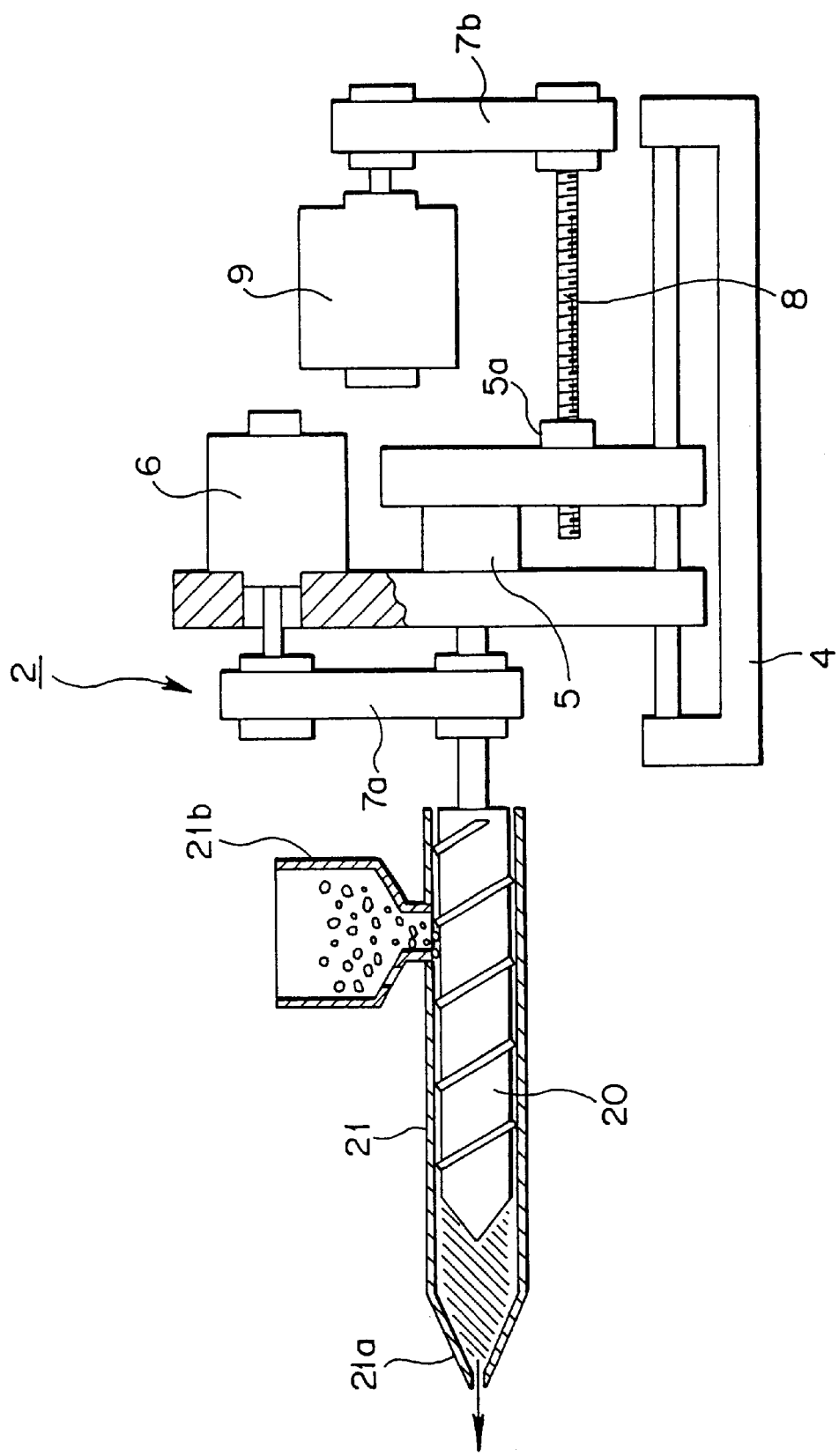
FIG. 1 is a schematic view of a conventional injection apparatus.
Figure 2:
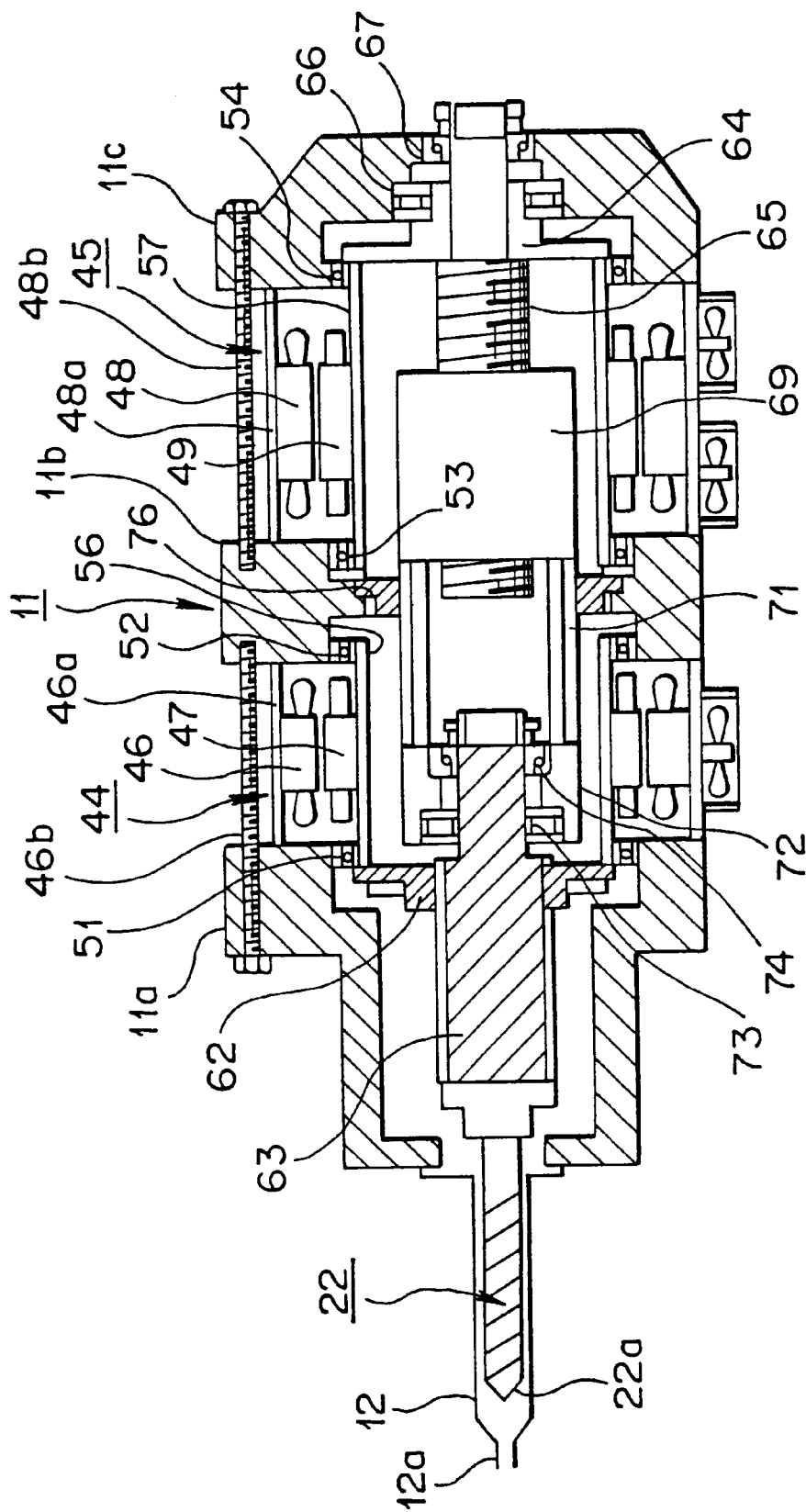
FIG. 2 is a sectional view of a conventional built-in-motor-type injection apparatus.

As described above, since rotation of the injection motor 82 is transmitted directly to the ball screw shaft/spline shaft unit 98 without intervention of a speed reduction mechanism, a pulley, and the like, mechanical efficiency can be improved, and inertia can be decreased. As a result, as shown in FIG. 5, during the injection stage, it becomes possible to shorten the time required for establishing or changing the injection speed and to reduce the torque required for establishing or changing the injection speed. Further, the time required for changeover from the injection stage to the pressure holding stage is shortened. In FIG. 5, line L1 represents the injection characteristics of the conventional injection apparatus shown in FIG. 1; line L2 represents the injection characteristics of the conventional built-in-motor-type injection apparatus shown in FIG. 2; and line L3 represents the injection characteristics of the built-in-motor-type injection apparatus shown in FIG. 3.

Since the engagement member 101 is fixed onto the rotor shaft 93 at a substantially central portion thereof, the spline shaft portion 98b can be advanced and retracted within the rotor 92. Further, the drive-side pulley 86, the driven-side pulley 88, and the timing belt 89, all provided for transmission of rotation of the metering motor 81 to the screw 22, can be disposed to overlap the bearing box 13 in the axial direction. Accordingly, the injection molding machine can be reduced in axial length.

In the present embodiment, the metering motor 81 and the ball screw shaft/spline shaft unit 98 are disposed on different axes. However, the injection motor, the ball screw shaft/ spline shaft unit, and the screw may be disposed on different axes.

Next, a second embodiment of the present invention will be described.

Figure 6:
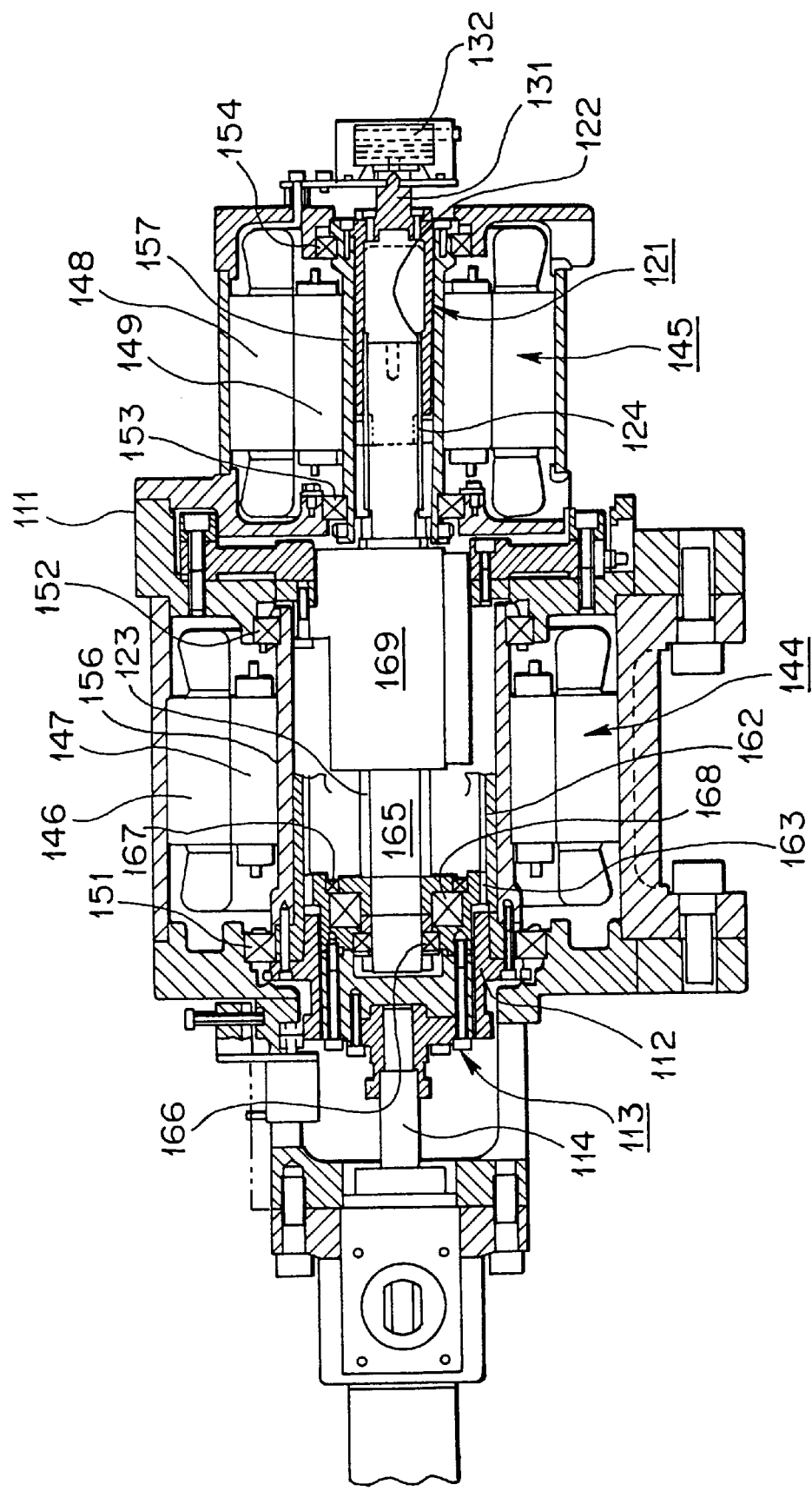
FIG. 6 is a sectional view of a drive section of a built-in-motor-type injection apparatus according to a second embodiment of the present invention.

FIG. 6 is a sectional view of a drive section of a built-in-motor-type injection apparatus according to the second embodiment of the present invention.

In FIG. 6, reference numeral 111 denotes a drive section casing. A metering motor 144 serving as first drive means is disposed at the front portion (left-side portion in FIG. 6) of the drive section casing 111, and an injection motor 145 serving as second drive means is disposed at the rear portion (right-side portion in FIG. 6) of the drive section casing 111 such that the metering motor 144 and the injection motor 145 share a common center axis. The metering motor 144 comprises a stator 146 and a rotor 147, and the injection motor 145 comprises a stator 148 and a rotor 149.

The rotor 147 is supported to be rotatable relative to the drive section casing 111. Specifically, a hollow first rotor shaft 156 is fixedly fitted into the rotor 147, and the first rotor shaft 156 is rotatably supported by the drive section casing 111 via bearings 151 and 152.

Similarly, the rotor 149 is supported to be rotatable relative to the drive section casing 111. Specifically, a hollow second rotor shaft 157 is fixedly fitted into the rotor 149, and the second rotor shaft 157 is rotatably supported by the drive section casing 111 via bearings 153 and 154.

During a metering stage, the screw 22 (FIG. 4) serving as an injection member can be retracted, while being rotated, through drive of the metering motor 144. In order to enable this movement, a cylindrical spline sleeve 162 and a cylindrical guide 112 are attached to the front end of the first rotor shaft 156; a bearing box 113 is slidably disposed within the guide 112; and the bearing box 113 is connected to the screw 22 via a rod 114. The spline sleeve 162 extends from the front end portion (left-side end portion in FIG. 6) to an approximate center of the first rotor shaft 156. The spline sleeve 162 is in spline-engagement with a spline shaft portion 163 formed at the rear end (right-side end in FIG. 6) of the bearing box 113. Therefore, when the rotor 147 is rotated through drive of the metering motor 144, rotation of the rotor 147 is transmitted to the screw 22, so that the screw 22 rotates. At this time, the spline shaft portion 163 is retracted (moved rightward in FIG. 6) relative to the spline sleeve 162, so that the screw 22 is retracted as well. Thus, metering is performed. It is to be noted that when the screw 22 is retracted, back pressure is applied to the screw 22 against pressure generated by the resin.

Further, during an injection stage, the screw 22 can be advanced without rotation, through drive of the injection motor 145. In order to enable this movement, bearings 166 and 167 and a thrust bearing 168 are disposed within the bearing box 113. The front end of a ball screw shaft/spline shaft unit 165 serving as a transmission shaft is rotatably supported by the bearings 166 and 167, and thrust load is borne by the thrust bearing 168. At a location between the rear end of the first rotor shaft 156 and the front end of the second rotor shaft 157, a ball nut 169 is fixed to the drive section casing 111. The ball nut 169 is in screw-engagement with a ball screw shaft portion 123, which is formed at the front-half portion of the ball screw shaft/spline shaft unit 165 and serves as a motion conversion portion. Further, a cylindrical engagement member 121 is attached to the rear end of the second rotor shaft 157. The engagement member 121 extends from the rear end portion (right-side end portion in FIG. 6) to an approximate center of the second rotor shaft 157, and a spline 122 is formed on the inner circumference at the front end thereof. Via the spline 122, the engagement member 121 is in screw-engagement with a spline shaft portion 124, which is formed at the rear-half portion of the ball screw shaft/spline shaft unit 165 and serves as a rotation transmission portion. That is, the front end portion of the ball screw shaft/spline shaft unit 165 is rotatably supported relative to the drive section casing 111 by the bearing 151 via the bearing box 113 and the first rotor shaft 156, and the rear end portion of the ball screw shaft/spline shaft unit 165 is rotatably supported relative to the drive section casing 111 by the bearing 154 via the engagement member 121 and the second rotor shaft 157. The bearing box 113 constitutes drive force transmission means which allows relative rotation between the screw 22 and the ball screw shaft/spline shaft unit 165 while restricting relative axial movement between the screw 22 and the ball screw shaft/spline shaft unit 165. Further, the engagement member 121 and the spline shaft portion 124 constitute rotation transmission means to which rotation of the injection motor 145 is transmitted. The ball nut 169 and the ball screw shaft portion 123 constitute motion conversion means for converting rotational motion to linear motion.

An end cap 131 is fixed to the rear end of the second rotor shaft 157. The end cap 131 seals the interior of the second rotor shaft 157 in order to prevent entry of foreign matter. Further, an encoder 132 is attached to the end cap 131 in order to directly detect the number of revolutions of the ball screw shaft/spline shaft unit 165. Therefore, in an unillustrated control section, the position of the ball screw shaft/spline shaft unit 165 can be calculated on the basis of the number of revolutions of the ball screw shaft/spline shaft unit 165.

In the present embodiment, rotation of the rotor 149 is transmitted to the ball screw shaft/spline shaft unit 165 via the second rotor shaft 157 and the engagement member 121, and the thus-transmitted rotational motion is converted into linear motion by the ball nut 169 and the ball screw shaft portion 123, so that the ball screw shaft/spline shaft unit 165 is advanced and retracted (moved leftward and rightward in FIG. 6). Therefore, when the rotor 149 is rotated through drive of the injection motor 145 to thereby advance the ball screw shaft/spline shaft unit 165, the screw 22 is advanced without being rotated. Thus, injection can be performed.

In the above-described structure, rotation of the metering motor 144 and rotation of the injection motor 145 are transmitted to the screw 22 without intervention of a reduction mechanism, pulleys, etc. Therefore, mechanical efficiency increases, and inertia decreases.

Since the spline 122 is disposed at a substantially central portion of the rotor 149, the spline shaft portion 124 can be advanced and retracted within the rotor 149. Further, the spline sleeve 162 and the spline shaft portion 163, provided for transmission of rotation of the metering motor 144 to the screw 22, can be disposed to overlap the ball screw shaft portion 123 in the axial direction. Accordingly, the injection molding machine can be reduced in axial length.

Next, a third embodiment of the present invention will be described. Those portions having the same configurations as in the second embodiment are denoted by the same reference numbers, and their descriptions are omitted.

Figure 7:
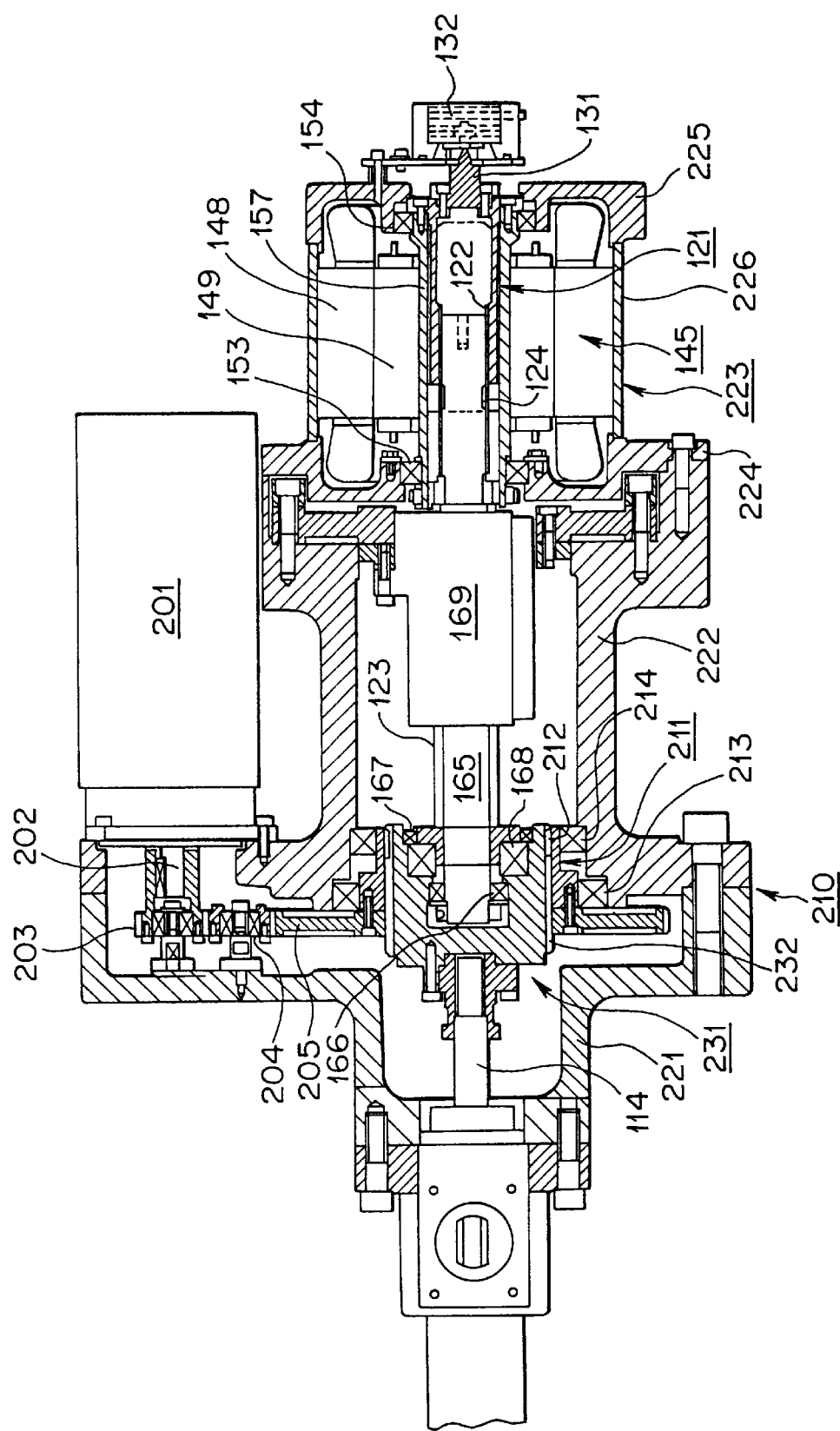
FIG. 7 is a sectional view of a drive section of a built-in-motor-type injection apparatus according to a third embodiment of the present invention.

FIG. 7 is a sectional view of a drive section of a built-in-motor-type injection apparatus according to the third embodiment of the present invention.

In FIG. 7, reference numeral 210 denotes a drive section casing, which comprises a front casing 221, a center casing 222, and a rear casing 223. The rear casing 223 is formed of a cylindrical portion 226, and end plates 224 and 225 covering the opposite ends of the cylindrical portion 226. A metering motor 201 serving as first drive means is disposed at the front end (left-side end in FIG. 7) of the center casing 222, and the injection motor 145 serving as second drive means is disposed within the rear casing 223. The metering motor 201 and the screw 22 (FIG. 4) serving as an injection member are disposed on different parallel axes. The injection motor 145 and the screw 22 are disposed on the same axis. At the front end of the center casing 222, a spline nut 211 is rotatably supported by bearings 213 and 214, and a spline 212 is formed on the inner circumferential surface of the spline nut 211 at the rear end (right-side end in FIG. 7) thereof. A drive-side gear 203 is attached to an output shaft 202 of the metering motor 201 and is in meshing-engagement with an idle gear 204, which is rotatably supported by the front casing 221. A driven-side gear 205 is attached to the front end of the spline nut 211 and is in meshing-engagement with the idle gear 204. Accordingly, rotation generated through drive of the metering motor 201 is transmitted to the spline nut 211 via the drive-side gear 203, the idle gear 204, and the driven-side gear 205.

A bearing box 231 is disposed radially inward with respect to the driven-side gar 205 and the spline nut 211. A spline 232 is formed on the outer circumferential surface of the bearing box 231, and the bearing box 231 is in spline-engagement with the spline nut 211.

The drive-side gear 203, the idle gear 204, and the driven-side gear 205 constitute transmission means for connecting the bearing box 231 and the metering motor 201.

The screw 22 can be advanced (moved leftward in FIG. 7) without being rotated through drive of the injection motor 145. For this purpose, the bearings 166 and 167 and the thrust bearing 168 are disposed inside the bearing box 231; the front end of the ball screw shaft/spline shaft unit 165 serving as the transmission shaft is rotatably supported by the bearings 166 and 167; and a thrust load is received by the thrust bearing 168. Further, at a location between the rear end of the center casing 222 and the front end of the second rotor shaft 157, the ball nut 169 is fixed to the center casing 222 and is in screw-engagement with the ball screw shaft portion 123, which is formed at the front-half portion of the ball screw shaft/spline shaft unit 165 and serves as a motion conversion portion. The ball nut 169 and the ball screw shaft/spline shaft unit 165 constitute motion conversion means for converting rotational motion to linear motion.

Accordingly, when the metering motor 201 is driven during a metering stage, rotation of the metering motor 201 is successively transmitted to the drive-side gear 203, the idle gear 204, the spline nut 211, the bearing box 231, the rod 114, and the screw 22, so that the screw 22 is rotated. In this case, the screw 22 is coupled with the ball screw shaft/spline shaft unit 165 via the bearing box 231 such that relative rotation therebetween is allowed. Therefore, although rotation transmitted to the bearing box 231 is not transmitted to the ball screw shaft/spline shaft unit 165, pressure of resin within the heating cylinder 12 is transmitted to the ball screw shaft/spline shaft unit 165 via the bearing box 231. Accordingly, the ball screw shaft/spline shaft unit 165 is retracted (moved rightward in FIG. 7) while being rotated, so that the screw 22 is also retracted accordingly. When the screw 22 is retracted, back pressure is applied to the screw 22 against the pressure of the resin.

Meanwhile, when the injection motor 145 is driven during an injection stage, rotation of the injection motor 145 is sequentially transmitted to the second rotor shaft 157, the engagement member 121, and the ball screw shaft/spline shaft unit 165. Since the ball nut 169 is fixed to the center casing 222, the ball screw shaft/spline shaft unit 165 is advanced while being rotated, so that the screw 22 is advanced without being rotated.

In the present embodiment, since the spline 122 is provided at substantially the center of the second rotor shaft 157, the spline shaft portion 124 serving as a rotation transmission portion can be advanced and retracted (moved leftward and rightward in FIG. 7) within the rotor 149. Further, the drive-side pulley 203, the idle gear 204, the driven-side pulley 205, and the spline nut 211, all provided for transmission of rotation of the metering motor 201 to the screw 22, can be disposed to overlap the bearing box 231 in the axial direction. Accordingly, the injection molding machine can be decreased in axial length. The engagement member 121 and the ball screw shaft/spline shaft unit 165 constitute rotation transmission means.

Although the screw 22 is used as the injection member in each of the above-described embodiments, a plunger may be used in place of the screw 22.

A fourth embodiment of the present invention will now be described.

Figure 8:
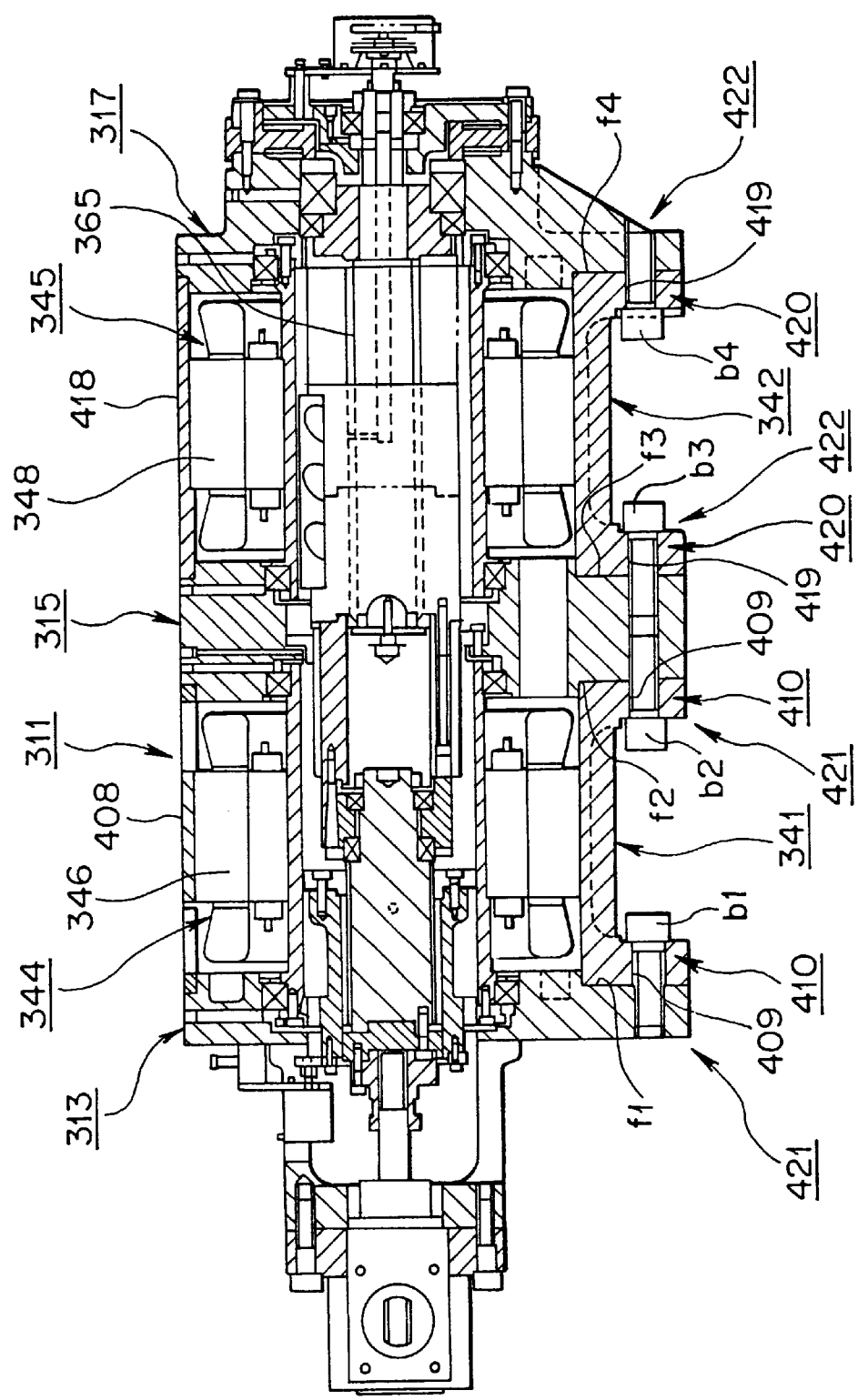
FIG. 8 is an explanatory view showing a drive section casing of a built-in-motor-type injection apparatus according to a fourth embodiment of the present invention.
Figure 9:
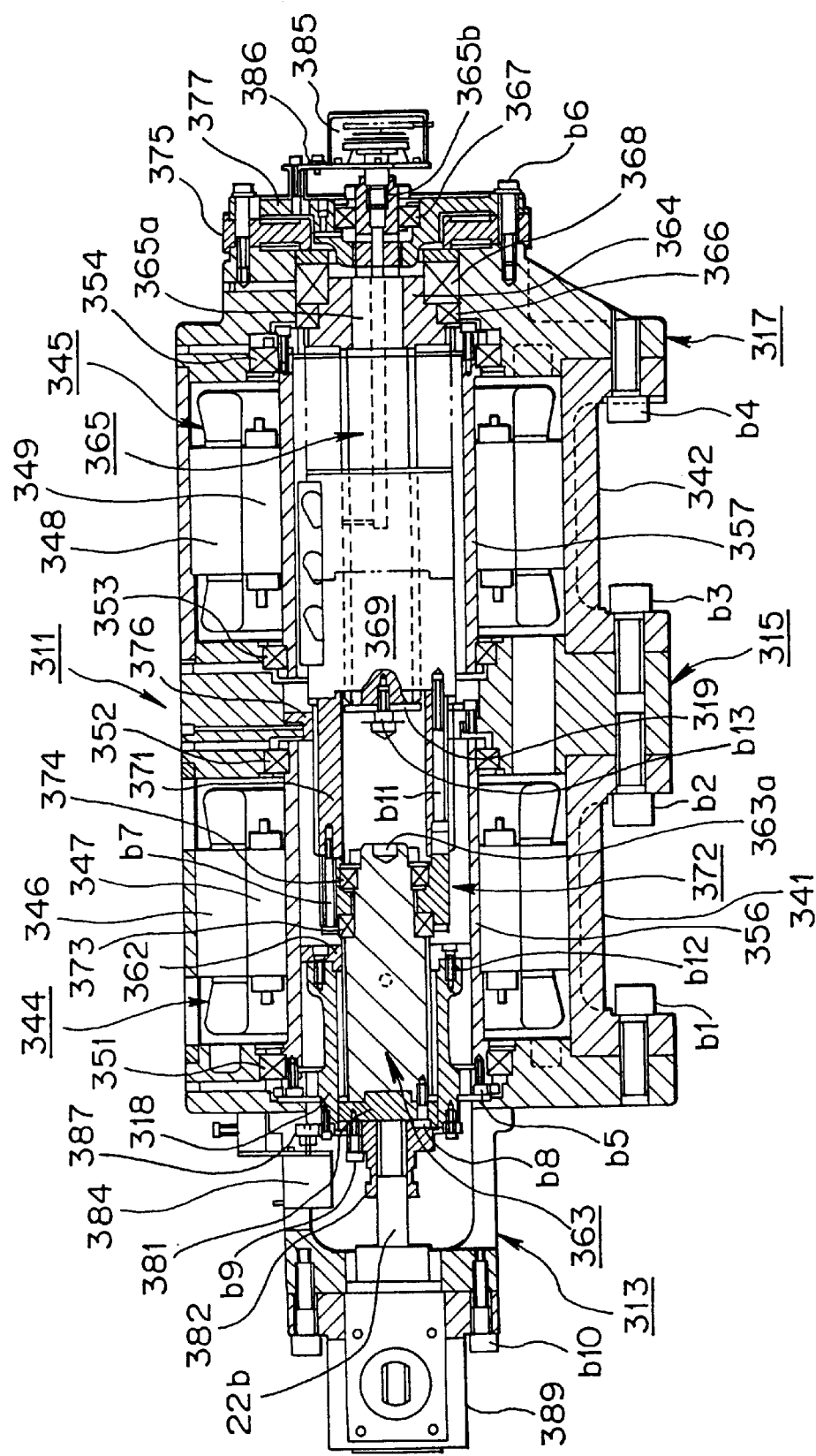
FIG. 9 is a sectional view of a drive section of the built-in-motor-type injection apparatus according to the fourth embodiment of the present invention.
Figure 10:
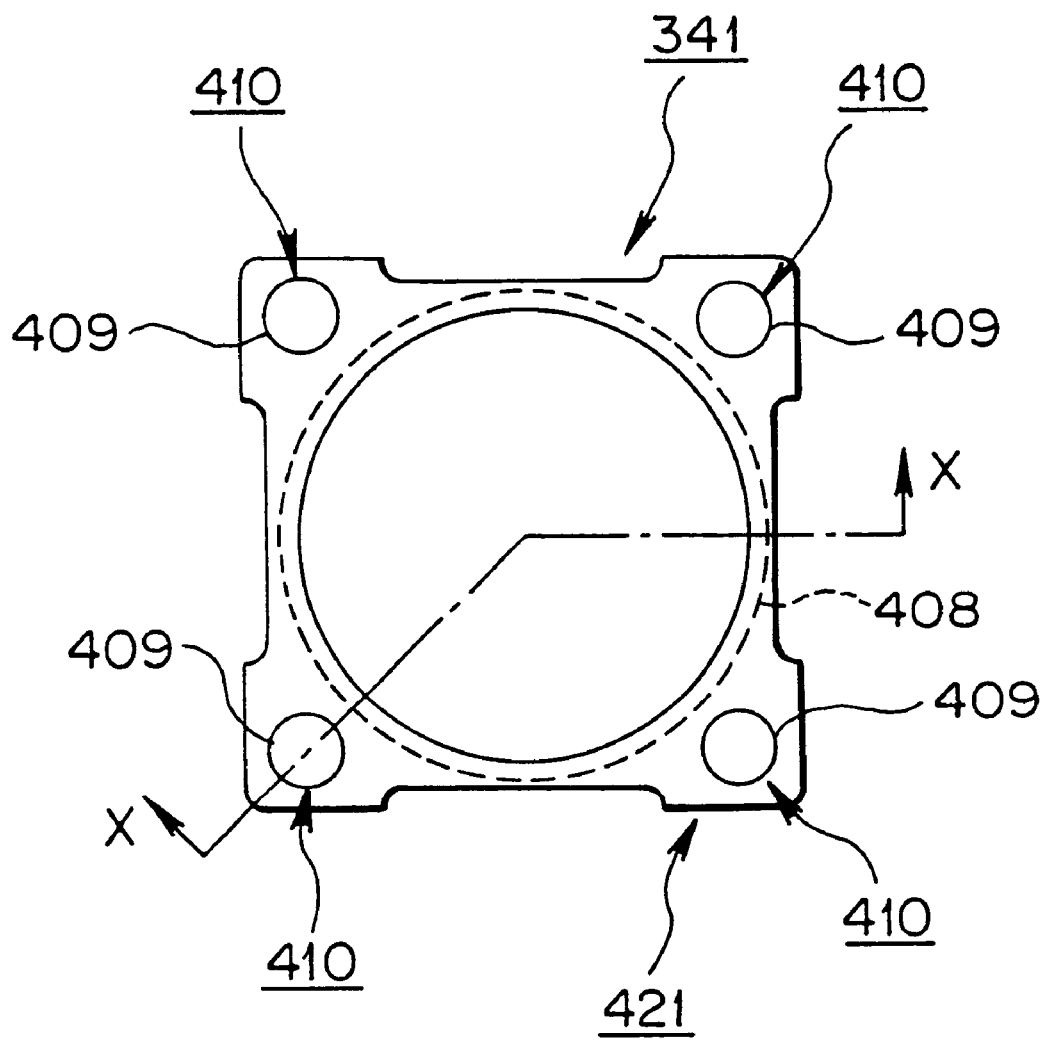
FIG. 10 is a side view of the front frame in the fourth embodiment of the present invention.

FIG. 8 is an explanatory view showing a drive section casing of a built-in-motor-type injection apparatus according to a fourth embodiment of the present invention; FIG. 9 is a sectional view of a drive section of the built-in-motor-type injection apparatus according to the fourth embodiment of the present invention; and FIG. 10 is a side view of the front frame in the fourth embodiment of the present invention. FIG. 8 is a sectional view taken along line X—X in FIG. 10.

In FIGS. 8–10, reference numeral 311 denotes a drive section casing which encloses a drive section and is fixed to the rear end of the heating cylinder 12 (FIG. 4) serving as a cylinder member. The drive section casing 311 comprises a front cover 313; a center frame 315; a rear cover 317; a front frame 341 connecting the front cover 313 and the center frame 315; and a rear frame 342 connecting the center frame 315 and the rear cover 317. In this case, the front frame 341 and the rear frame 342 constitute a stator frame; the front cover 313, the center frame 315, and the rear cover 317 constitute an apparatus frame; and the front frame 341 and the rear frame 342 serve as an apparatus frame as well. The front cover 313 and the front frame 341 are removably connected together by use of bolts b1; the front frame 341 and the center frame 315 are removably connected together by use of bolts b2; the center frame 315 and the rear frame 342 are removably connected together by use of bolts b3; and the rear frame 342 and the rear cover 317 are removably connected together by use of bolts b4. For the front frame 341, the front cover 313 serves as a first plate, and the center frame 315 serves as a second plate. For the rear frame 342, the center frame 315 serves as a first plate, and the rear cover 317 serves as a second plate.

Therefore, the front cover 313 can be separated from the front frame 341 through removal of the bolts b1; the front frame 341 can be separated from the center frame 315 through removal of the bolts b2; the rear frame 342 can be separated from the center frame 315 through removal of the bolts b3; and the rear cover 317 can be separated from the rear frame 342 through removal of the bolts b4. Thus, it becomes possible to replace a metering motor 344 serving as first drive means and an injection motor 345 serving as second drive means. As a result, assembly and maintenance of the injection molding machine are facilitated. Each of the metering motor 344 and the injection motor 345 is a hollow-type motor.

The metering motor 344 is disposed at the front portion (left-side portion in FIG. 9) of the drive section casing 311, and the injection motor 345 is disposed at the rear portion (right-side portion in FIG. 9) of the drive section casing 311 such that the metering motor 344 and the injection motor 345 share a common center axis. The metering motor 344 comprises a stator 346 supported by the front frame 341 and an annular rotor 347 disposed inside the stator 346. The injection motor 345 comprises a stator 348 supported by the rear frame 342 and an annular rotor 349 disposed inside the stator 348.

The rotor 347 is supported to be rotatable relative to the drive section casing 311. Specifically, a hollow first rotor shaft 356 is fixedly fitted into the rotor 347; the front end (left-side end in FIG. 9) of the first rotor shaft 356 is supported by the front frame 341 via a bearing 351; and the rear end (right-side end in FIG. 9) of the first rotor shaft 356 is supported by the center frame 315 via a bearing 352.

Similarly, the rotor 349 is supported to be rotatable relative to the drive section casing 311. Specifically, a hollow second rotor shaft 357 is fixedly fitted into the rotor 349; the front end of the second rotor shaft 357 is supported by the center frame 315 via a bearing 353; and the rear end of the second rotor shaft 357 is supported by the rear frame 342 via a bearing 354.

When a current of a predetermined frequency is supplied to the stator 346 of the metering motor 344, the screw 22 serving as an injection member can be retracted (moved rightward in FIG. 9) while being rotated. In order to enable this movement, a sleeve 318 is attached to the front portion of the first rotor shaft 356 to be located radially inside the first rotor shaft 356; and the front end of the sleeve 318 is fixed to the front end of the first rotor shaft 356 by use of bolts b5. Further, at a predetermined position located rearward (rightward in FIG. 9) with respect to the front end of the first rotor shaft 356, or on the rear end of the sleeve 318, there is disposed a first spline nut 362, which is fixed to the rear end of the sleeve 318 by use of bolts b12. The first spline nut 362 is in spline-engagement with a first spline shaft 363. The screw 22 is fixed to the front end of the first spline shaft 363. In this case, the first spline nut 362 and the first spline shaft 363 constitute first drive force transmission means, thereby allowing relative axial movement between the sleeve 318 and a first coupling 381 while restricting relative rotation between the sleeve 318 and the first coupling 381. The first spline shaft 363 has a length corresponding to the stroke of the screw 22.

Therefore, when the rotor 347 is rotated through drive of the metering motor 344, rotation of the rotor 347 is transmitted to the screw 22 via the first rotor shaft 356, the sleeve 318, the first spline nut 362, and the first spline shaft 363, so that the screw 22 is rotated. As a result, the resin is advanced (moved leftward in FIG. 9) within the groove 26 while being melted, and the screw 22 is retracted by means of back pressure generated upon advancement of the resin.

At this time, since the first spline nut 362 is in spline-engagement with the first spline shaft 363, the first spline shaft 363 is retracted relative to the first spline nut 362.

Meanwhile, when a current of a predetermined frequency is supplied to the stator 348 of the injection motor 345, the screw 22 can be advanced without being rotated. In order to enable this movement, an annular bearing retainer 364 is fixed to the rear end of the second rotor shaft 357; and a first shaft portion 365*a* of a ball screw shaft 365 is fixedly fitted into the bearing retainer 364. The ball screw shaft 365 is rotatably supported by the drive section casing 311.

Specifically, the ball screw shaft 365 is supported by the rear cover 317 via the bearing retainer 364, a bearing 366, and a thrust bearing 368. By use of bolts b6, a rear cap 377 is fixed to the rear cover 317 via an annular load cell 375 serving as load detection means. A second shaft portion 365*b* of the ball screw shaft 365 is supported by the rear cap 377 via a bearing 367. An absolute pulse encoder 385 is attached to the rear cap 377 via a bracket 386. The absolute pulse encoder 385 is connected to the second shaft portion 365*b* and serves as first rotational amount detection means for detecting the number of revolutions of the ball screw shaft 365 or the number of revolutions of the injection motor, and serves as screw position detection means for detecting the position of the screw 22 on the basis of the number of revolutions of the injection motor.

Further, a ball nut 369 is disposed within the second rotor shaft 357 such that the ball nut 369 can advance and retract (move leftward and rightward in FIG. 9). The ball nut 369 is brought into meshing-engagement with the ball screw shaft 365 in order to constitute a motion conversion portion. Therefore, when the rotor 349 is rotated through drive of the injection motor 345, rotation of the rotor 349 is transmitted to the ball screw shaft 365 via the second rotor shaft 357 and the bearing retainer 364, so that rotational motion is converted to linear motion in order to advance and retract the ball nut 369. In order to prevent the ball screw shaft 365 from coming off the ball nut 369, a stopper 319 is fixed to the front end of the ball screw shaft 365 by use of a bolt b13.

Further, in order to prevent the ball nut 369 from rotating together with the ball screw shaft 365, a sleeve-shaped second spline shaft 371 is fixed to the front end of the ball nut 369 by use of bolts b11, and the second spline shaft 371 is in spline-engagement with a second spline nut 376 fixed to the center frame 315. In this case, the second spline nut 376 and the second spline shaft 371 constitute second drive force transmission means, thereby allowing relative axial movement between the center frame 315 and a bearing box 372, which serves as third drive force transmission means and which will be described later, while restricting relative rotation between the center frame 315 and the bearing box 372. The second spline shaft 371 has a length corresponding to the stroke of the screw 22.

The bearing box 372 is fixed to the front end of the second spline shaft 371 by use of bolts b7. A thrust bearing 373 is disposed within the bearing box 372 to be located on the front side (left side in FIG. 9) thereof, and a bearing 374 is disposed within the bearing box 372 to be located on the rear side thereof. In this case, the bearing box 372 allows relative rotation between the first spline shaft 363 and the second spline shaft 371, while restricting relative axial movement between the first spline shaft 363 and the second spline shaft 371. Therefore, the first spline shaft 363 is supported by the thrust bearing 373 and the bearing 374 to be rotatable relative to the second spline shaft 371 and the ball nut 369.

Further, by use of bolts b8 and b9, a rear end shaft 22*b* of the screw 22 is fixed to the front end of the first spline shaft 363 via the first coupling 381 and a second coupling 382. The first coupling 381 is slid within the sleeve 318 as the screw 22 advances and retracts. Moreover, a depression 363*a* is formed at the rear end of the first spline shaft 363 in order to prevent interference between the first spline shaft 363 and the head of the bolt b13, which interference would otherwise occur when the first spline shaft 363 is located at a retracted position. Accordingly, the injection molding machine can be reduced in axial length.

Reference numeral 384 denotes an encoder connected to the sleeve 318 via a gear train 387. The encoder 384 serves as second rotational amount detection means for detecting the number of revolutions of the sleeve 318 or the number of revolutions of the metering motor. Reference numeral 389 denotes a water cooling jacket fixed to the front cover 313 by use of bolts b10. The water cooling jacket 389 prevents transmission of heat from the rear end of the heating cylinder 12 to the front cover 313.

Next, operation of the drive section having the above-described structure will be described.

When a current is supplied to the stator 348 of the injection motor 345 during an injection stage, the rotor 349 is rotated, and rotation of the rotor 349 is transmitted to the ball screw shaft 365 via the second rotor shaft 357 and the bearing retainer 364, so that the ball screw shaft 365 is rotated. At this time, the ball nut 369 does not rotate, because the second spline shaft 371 is in spline-engagement with the second spline nut 376 fixed to the center frame 315. Accordingly, a thrust force acts on the ball nut 369, so that the ball nut 369 is advanced.

During the above-described injection stage, the metering motor 344 is not driven, and the rotor 347 is in a stopped state. Therefore, the first spline shaft 363 disposed on the front side of the ball nut 369 is advanced in order to advance the screw 22.

In the above-described manner, rotational motion generated by the injection motor 345 is converted to linear motion by means of the ball screw shaft 365 and the ball nut 369. As a result, resin accumulated forward of the screw 22 is injected from the injection nozzle 12a.

When a current is supplied to the stator 346 of the metering motor 344 during a metering stage, the rotor 347 is rotated, and rotation of the rotor 347 is transmitted to the first spline shaft 363 via the first rotor shaft 356, the sleeve 318, and the first spline nut 362, so that the first spline shaft 363 is rotated. The rotation of the first spline shaft 363 is transmitted to the screw 22 in order to rotate the screw 22. As a result, the resin is advanced within the groove 26 while being melted, and the screw 22 is retracted by means of back pressure generated upon advancement of the resin.

At this time, the first spline shaft 363 is retracted relative to the first spline nut 362 because the first spline nut 362 is in spline-engagement with the first spline shaft 363.

The injection motor 345 is driven, while the back pressure of the resin under metering is controlled, such that the rotor 349 rotates in a direction for retracting the screw 22. At this time, the load acting in the axial direction of the screw 22, etc., is detected by use of the load cell 375, and the back pressure is calculated on the basis of the detected load. Alternatively, an unillustrated pressure sensor may be disposed within the heating cylinder 12 in order to detect the pressure of the resin within the heating cylinder 12, thereby calculating the back pressure on the basis of the detected pressure.

The front frame 341 is formed of a cylindrical portion 408 supporting the stator 346, and a rectangular flange portion 421 integrally formed at either end of the cylindrical portion 408. The flange portion 421 has four corner portions 410 each having a hole 409, through which the bolt b1 or b2 is passed.

In order to enable positioning of the front frame 341 relative to the front cover 313, a circular stepped portion f1 is formed on the front cover 313. Similarly, in order to enable positioning of the front frame 341 relative to the center frame 315, a circular stepped portion f2 is formed on the center frame 315.

The rear frame 342 is formed of a cylindrical portion 418 supporting the stator 348, and a rectangular flange portion 422 integrally formed at either end of the cylindrical portion 418. The flange portion 422 has four corner portions 420 each having a hole 419, through which the bolt b3 or b4 is passed.

In order to enable positioning of the rear frame 342 relative to the center frame 315, a circular stepped portion f3 is formed on the center frame 315. Similarly, in order to enable positioning of the rear frame 342 relative to the rear cover 317, a circular stepped portion f4 is formed on the rear cover 317.

As described above, the front cover 313 and the center frame 315 are connected together by means of the front frame 341, and the center frame 315 and the rear cover 317 are connected together by means of the rear frame 342. Further, the front frame 341 is formed of the cylindrical portion 408 and the flange portions 421, and the rear frame 342 is formed of the cylindrical portion 418 and the flange portions 422. Therefore, the front frame 341 and the rear frame 342 are not extended even when a reaction force corresponding to an injection force is transmitted from the heating cylinder 12 to the front frame 341 via the front cover 313 and is also transmitted, as a tensile force, to the rear frame 342 via the rear cover 317, during an injection stage in which the injection motor 345 is driven to rotate the ball screw shaft 365 such that the screw 22 is advanced in order to inject resin from the heating cylinder 12. Therefore, the tightening forces of the bolts b1–b4 do not become weaker.

Further, even when the tightening forces of the bolts b1-b4 become weaker, the front frame 341 and the rear frame 342 do not rotate upon drive of the metering motor 344 or the injection motor 345, because the front cover 313 and the front frame 341 are fixed together by use of the bolts b1, the front frame 341 and the center frame 315 are fixed together by use of the bolts b2, the center frame 315 and the rear frame 342 are fixed together by use of the bolts b3, and the rear frame 342 and the rear cover 317 are fixed together by use of the bolts b4.

Therefore, the tightening forces of the bolts b1–b4 are not required to be controlled strictly, so that assembly and maintenance of the injection molding machine are facilitated.

In the present embodiment, the sleeve 318 is attached to the front portion of the first rotor shaft 356 to be located radially inside the first rotor shaft 356; and the front end of the sleeve 318 is fixed to the front end of the first rotor shaft 356. Further, the first spline nut 362 is fixed to the rear end of the sleeve 318; the first spline nut 362 is in spline-engagement with the first spline shaft 363 at an approximate center of the first rotor shaft 356; and the screw 22 is fixed to the front end of the first spline shaft 363.

Therefore, when the screw 22 is located at the retraction end of the stroke, the rear end of the screw 22 can be positioned at a position slightly offset forward from the center of the first rotor shaft 356, or a position separated rearward from the front end of the first rotor shaft 356 by a distance corresponding to the length of the sleeve 318.

In this case, during advancement and retraction of the screw 22, the screw 22 can overlap with the metering motor 344. Therefore, the injection molding machine can be reduced in axial length.

The present invention is not limited to the above-described embodiments. Numerous modifications and variations of the present invention are possible in light of the spirit of the present invention, and they are not excluded from the scope of the present invention.

Industrial Applicability

The present invention is applicable to motor-driven-type injection molding machines.

What is claimed is:

1. An injection molding machine comprising:
   (a) a cylinder member;
   (b) an injection member disposed within said cylinder member such that said injection member can advance and retract;
   (c) an injection motor; and
   (d) a transmission shaft which is connected to said injection member such that said transmission shaft can rotate relative to said injection member, said transmission shaft having a rotation transmission portion, to which rotation of said injection motor is transmitted, as well as a motion conversion portion for converting rotational motion to linear motion, wherein
   (e) said injection motor and said transmission shaft are disposed on the same axis; and
   (f) said transmission shaft is advanced and retracted inside a rotor of said injection motor.

2. An injection molding machine according to claim 1, wherein said injection motor and said transmission shaft are disposed on the same axis as that of said injection member.

3. An injection molding machine according to claim 1, wherein
   (a) said injection molding machine comprises a metering motor; and
   (b) said metering motor is disposed on the same axis as that of said injection member.

4. An injection molding machine according to claim 1, wherein
   (a) said injection molding machine comprises a metering motor; and
   (b) said metering motor is disposed on an axis different from that of said injection member and is connected to said injection member via transmission means.

5. An injection molding machine according to claim 1, wherein said transmission shaft comprises a ball screw shaft portion and a spline shaft portion.

6. An injection molding machine according to claim 1, wherein
   (a) the injection motor comprises a hollow motor having a stator and the rotor;
   (b) a stator frame disposed to surround said injection motor and supporting said stator; and
   (c) first and second plates removably connected to opposite ends of said stator frame, wherein each of said first and second plates support said stator frame, and transmit a reaction force corresponding to an injection force to said stator frame.

7. An injection molding machine according to claim 6, wherein a tensile force generated upon drive of said hollow motor is transmitted to said stator frame.

8. An injection molding machine according to claim 6, wherein said stator frame has a cylindrical portion for supporting said stator and flange portions formed at opposite ends of said cylindrical portion.

9. An injection molding machine according to claim 1, further comprising:
   (a) a rotatably supported hollow rotor shaft;
   (b) a metering motor comprising a stator, and a rotor is disposed on the radially inner side of said stator and fixed to said rotor shaft; wherein
   (c) the injection member is disposed on the same axis as that of the metering motor, and
   (d) when said injection member is located at the retraction end of a stroke, the rear end of said injection member is moved to a position located rearward from the front end of said rotor shaft.

10. An injection molding machine according to claim 9, wherein a sleeve is fixed to the front end of said rotor shaft; a spline nut is fixed to the rear end of said sleeve; and a spline shaft in spline-engagement.

11. An injection molding machine according to claim 9, wherein
   (a) the metering motor comprises a hollow motor having the stator and the rotor;
   (b) a stator frame disposed to surround said metering motor and supporting said stator; and
   (c) first and second plates removably connected to opposite ends of said stator frame, supporting said stator frame, and transmitting a reaction force corresponding to an injection force to said stator frame.

12. An injection molding machine according to claim 1, further comprising:
   (a) a rotatably supported hollow rotor shaft;
   (b) a stator;
   (c) a rotor disposed on the radially inner side of said stator and fixed to said rotor shaft, wherein
   (d) the injection member disposed on the same axis as that of said rotor, and
   (e) when said injection member is located at the retraction end of a stroke, the rear end of said injection member is moved to a position located rearward from the front end of said rotor shaft.

* * * * *